(12) United States Patent
Bischoff et al.

(10) Patent No.: US 12,459,651 B2
(45) Date of Patent: Nov. 4, 2025

(54) SEAT COVERS AND METHODS FOR USING SEAT COVERS

(71) Applicant: The Boeing Company, Arlington, VA (US)

(72) Inventors: Timm K. Bischoff, Arlington, VA (US); Robert B. Laule, Arlington, VA (US)

(73) Assignee: The Boeing Company, Arlington, VA (US)

( * ) Notice: Subject to any disclaimer, the term of this patent is extended or adjusted under 35 U.S.C. 154(b) by 187 days.

(21) Appl. No.: 18/364,254

(22) Filed: Aug. 2, 2023

(65) Prior Publication Data

US 2025/0042554 A1    Feb. 6, 2025

(51) Int. Cl.
*B64D 11/06* (2006.01)

(52) U.S. Cl.
CPC .............................. *B64D 11/0647* (2014.12)

(58) Field of Classification Search
CPC ..... B60N 2/60; B60N 2/6009; B64D 11/0647
See application file for complete search history.

(56) References Cited

U.S. PATENT DOCUMENTS

| | | | | |
|---|---|---|---|---|
| 2,820,510 A * | 1/1958 | Sugarman | ............... | A47C 31/11 297/228 |
| 2,937,695 A * | 5/1960 | Coggin | ............... | A47C 31/11 297/227 |
| 6,428,098 B1 * | 8/2002 | Allbaugh | ............... | A47D 1/00 297/219.12 |
| 7,857,384 B2 * | 12/2010 | Miller | ............... | A47C 31/11 297/224 |
| 9,648,960 B2 * | 5/2017 | Scales | ............... | A47C 31/11 |
| 9,845,034 B1 * | 12/2017 | Lew | ............... | B60N 2/242 |
| 10,336,227 B1 * | 7/2019 | Weiss | ............... | B60N 2/6036 |
| 2005/0225135 A1 * | 10/2005 | Moses | ............... | B60R 22/00 297/228.1 |
| 2005/0264056 A1 * | 12/2005 | Hanberg | ............... | A47C 31/113 297/219.12 |
| 2008/0284219 A1 * | 11/2008 | Koontz, II | ............... | B60N 2/6018 297/220 |

(Continued)

FOREIGN PATENT DOCUMENTS

| | | | | |
|---|---|---|---|---|
| CN | 118849908 A | * | 10/2024 | ............... B60N 2/58 |
| DE | 102014109871 B3 | * | 1/2016 | ............... B60N 2/60 |

(Continued)

*Primary Examiner* — Timothy J Brindley
(74) *Attorney, Agent, or Firm* — Joseph M. Butscher; The Small Patent Law Group, LLC (57) ABSTRACT

Example implementations relate to seat covers and techniques for using such seat covers to partially cover and protect aisle seats on airplanes, buses, trains, and within other venues. An example seat cover for partially covering a seat includes a headrest cover configured to extend over a headrest of the seat, an armrest cover configured to extend over an armrest of the seat positioned proximate the aisle of the vehicle. The armrest cover includes a side surface that extends from the armrest of the seat to a position below a seat cushion of the seat when the seat cover is used to partially cover the seat. The seat cover also includes a side cover portion coupling together the headrest cover and the armrest cover, wherein the side cover portion is configured to extend along a side of a seat back of the seat.

20 Claims, 6 Drawing Sheets

(56) References Cited

U.S. PATENT DOCUMENTS

| | | | | |
|---|---|---|---|---|
| 2016/0338502 A1* | 11/2016 | Markowitz | ............ | A47C 31/11 |
| 2017/0297466 A1* | 10/2017 | Stenberg | ................ | B64D 11/06 |
| 2018/0027987 A1* | 2/2018 | Calhoun | .................. | A47C 7/62 |
| 2019/0142182 A1* | 5/2019 | Watson | .................. | A47C 7/386 |
| | | | | 297/220 |
| 2019/0261781 A1* | 8/2019 | Hoensheid | ............ | A45C 13/103 |
| 2019/0276150 A1* | 9/2019 | Cotterell | ............ | B64D 11/0627 |
| 2019/0337430 A1* | 11/2019 | Nourollah | ................ | B60N 2/60 |
| 2022/0297804 A1* | 9/2022 | Foschini | .................. | B60N 2/60 |

FOREIGN PATENT DOCUMENTS

| | | | | | |
|---|---|---|---|---|---|
| DE | 202016102839 U1 * | 2/2017 | | | |
| EP | 3208143 A1 * | 8/2017 | .............. | B60N 2/60 |
| EP | 3290262 A1 * | 3/2018 | .............. | B60N 2/60 |
| FR | 3115741 A1 * | 5/2022 | ............. | B60N 2/242 |
| IT | 202000002158 U1 * | 11/2021 | | |
| JP | H10212737 A * | 8/1998 | | |
| JP | 2001063415 A * | 3/2001 | | |
| WO | WO-2008109069 A1 * | 9/2008 | .............. | B60N 2/60 |
| WO | WO-2011088534 A1 * | 7/2011 | ............. | B60N 2/242 |
| WO | WO-2022183234 A1 * | 9/2022 | | |

* cited by examiner

SEAT COVERS AND METHODS FOR USING SEAT COVERS

FIELD

The present disclosure relates generally to seat covers, and more particularly to seat covers for partially covering the seats located next to an aisle in airplanes, buses, trains, and other types of vehicles.

BACKGROUND

A vehicle seat is a designated area for use by a passenger during transportation. In general, seats are included on various types of vehicles to enable passengers to sit comfortably and securely while traveling. Seats are typically designed with a combination of cushioning, support, and safety features to enhance passenger comfort while also reducing the risk of injury in the event of a collision or sudden movement. In airplanes, buses, and other types of large vehicles, seats are typically arranged in relation to one or more aisles to allow passengers to move through the vehicle and access the seats.

Aisle seats in vehicles, such as airplanes, buses, or trains, are more susceptible to sustaining damage and dirt caused by technicians testing parts and performing repairs for several reasons. The aisle seats are exposed to technicians as they move through the vehicle to conduct inspections and repairs. In some cases, technicians might inadvertently transfer dirt, grease, or other contaminants from their hands and clothing onto the seats. In addition, technicians typically carry tools and equipment with them as they move through the aisles to perform repairs. If the tools accidentally brush against the seats or are placed on the seats while working, the tools can cause scratches, tears, or other damage to the seat materials.

During repair and maintenance operations, the technicians may use carts to transport equipment and replacement parts. As these carts move through the narrow aisles, they can accidentally bump into the aisle seats, causing damage like scuffs or dents. Aisles are confined spaces, making it challenging for technicians to maneuver around without accidentally making contact with the seats. In such tight quarters, even small movements can lead to unintended damage. In addition, industries where vehicles have short turnaround times between trips (e.g., commercial airlines or buses), repair and maintenance tasks must be completed swiftly. The urgency to finish the work promptly can increase the likelihood of accidental damage to the aisle seats.

SUMMARY

In one example, a seat cover for partially covering a seat positioned next to an aisle of a vehicle is described. The seat cover includes a headrest cover configured to extend over a headrest of the seat and an armrest cover configured to extend over an armrest of the seat positioned proximate the aisle of the vehicle. The armrest cover includes a side surface that extends from the armrest of the seat to a position below a seat cushion of the seat when the seat cover is used to partially cover the seat. The seat cover also includes a side cover portion coupling together the headrest cover and the armrest cover. The side cover portion is configured to extend along a side of a seat back of the seat.

In another example, an aircraft is described. The aircraft includes a cabin having a plurality of seats that are arranged into rows, each row positioned relative to an aisle. The aircraft also includes one or more seat covers coupled to respective seats of the plurality of seats that are positioned next to the aisle. Each seat cover includes a headrest cover configured to extend over a headrest of a seat and an armrest cover configured to extend over an armrest of the seat positioned proximate the aisle. The armrest cover includes a side surface that extends from the armrest of the seat to a position below a seat cushion of the seat when the seat cover is used to partially cover the seat. The seat cover also includes a side cover portion coupling together the headrest cover and the armrest cover. The side cover portion is configured to extend along a side of a seat back of the seat.

In an additional example, a method for using a seat cover to partially protect a seat positioned next to an aisle in a vehicle is described. The method involves covering a headrest of the seat with a headrest cover of the seat cover and covering an armrest of the seat positioned proximate the aisle with an armrest cover of the seat cover. The armrest cover includes a side surface that extends from the armrest of the seat to a position below a seat cushion of the seat. A side cover portion of the seat cover couples together the headrest cover and the armrest cover and extends along a side of the seat.

The features, functions, and advantages that have been discussed can be achieved independently in various examples or may be combined in yet other examples further details of which can be seen with reference to the following description and drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

Disclosed examples will now be described more fully hereinafter with reference to the accompanying drawings, in which some, but not all of the disclosed examples are shown. Indeed, several different examples may be described and should not be construed as limited to the examples set forth herein. Rather, these examples are described so that this disclosure will be thorough and complete and will fully convey the scope of the disclosure to those skilled in the art.

Example implementations presented herein relate to seat covers and techniques for using the seat covers to partially cover aisle seats, such as the aisle seats located within an aircraft or another type of vehicle. By using disclosed seat covers to partially cover the seats positioned next to aisles, these seats can be protected from potential dirt and damage that the seats are exposed during various periods when the vehicle is not in use, such as during onboard repair and servicing, initial delivery of the vehicle to the vehicle's purchaser, and other periods when the aisle is used by technicians. The disclosed seat covers are designed to be securely protect parts of the seat while being easy to remove from the seat when use is no longer needed. In addition, the seat covers described herein can be used repeatedly, which may include being used to protect seats in different types of vehicles.

An example seat cover for partially covering a seat (e.g., a seat positioned next to an aisle of a vehicle) includes a headrest cover, an armrest cover, and a side cover portion coupling the headrest cover and the armrest cover together into a single piece. In some cases, the headrest cover, the armrest cover, and the side cover portion are sewn into the single piece form. In other cases, the headrest cover, the armrest cover, and the side cover portion can be connected via other fasteners, such as buttons or zippers. The fasteners can allow parts of the seat cover to be removed or switched. For instance, the armrest cover may be removed and reattached on the other side to enable the seat cover to be used to protect the armrest on seats positioned on both sides of the aisle.

The headrest cover is designed to extend over a headrest of the seat while the armrest cover is designed to extend over an armrest of the seat. To reduce damage that is positioned next to the aisle. As such, the particular design of the seat cover can depend on which side of the aisle that the seat is positioned on to ensure that the armrest cover protects the armrest exposed to potential damage caused by technicians, tools, and carts that use the aisle. The armrest cover includes a side surface that extends from the armrest of the seat to a position below a seat cushion of the seat when the seat cover is used to partially cover the seat. The side surface of the armrest cover protects the exterior side of the seat exposed to the aisle and can vary in length in some examples depending on the height and dimensions of the seat to be covered. In some cases, the side surface or another part of the armrest can include one or multiple slots, openings, mesh material, or other aspect that allows testing of lights positioned along the armrest or near the floor of the seat. In addition, the side cover portion of the seat cover is configured to extend along and thereby protect a side of the seatback of the seat. The width of the side cover can differ and can be wider to protect seats with wider seatbacks.

The unique design of the example seat cover described above and other seat covers described herein enable tests to be performed on the seat, such as lights, a monitor, the rear tray table, and the seatbelt. In particular, the design of the seat cover enables the seat cover to be secured to the seat to provide protection to external surfaces of the seat that are positioned nearby the aisle and exposed to carts and service technicians using the aisle of the vehicle while not covering the seatbelt or lights enabling the tests to be performed. The seat cover can be removed from the seat prior to a passenger using the seat.

An example method for using a disclosed seat cover to partially protect a seat cover positioned next to an aisle in a vehicle involves covering a headrest of the seat with a headrest cover of the seat cover. The method also involves covering an armrest of the seat positioned proximate the aisle with an armrest cover of the seat cover. The armrest cover includes a side surface that extends from the armrest of the seat to a position below a seat cushion of the seat. Based on covering the headrest and the armrest of the seat, a side cover portion of the seat cover that couples together the head cover and the armrest cover is extended along a side of the seat to protect this exterior surface of the seat. As such, the method can further involve performing one or more tests of a seatbelt, one or more lights, or a monitor located at the seat while the seat cover is partially protecting the seat. In addition, the method can involve removing the seat cover prior to use of the seat by a passenger.

Producing disclosed removable seat covers can involve several steps, including design, material selection, pattern making, cutting, sewing, and finishing. The first step involves designing the seat cover based on the specific seat's dimensions and shape. For instance, the seat covers designed for airline seats can differ from the seat covers generated for bus seats. Similarly, different size and shapes can be used when designing multiple seat covers for use on different types of seats positioned on the same vehicle (e.g., first class seats compared to economy seats). The design can be created using computer-aided design (CAD) software, which allows for precise measurements and customization.

In some examples, the choice of materials can depend on factors, such as comfort, durability, aesthetics, and budget. Example materials that can used for partial seat covers can include nylon, polyester, vinyl, and/or leatherette. Nylon is a synthetic material known for its excellent strength, abrasion resistance, and durability. It is also lightweight and quick-drying, making it suitable for use in seat covers. Nylon seat covers are often preferred for their resilience and ability to withstand wear and tear. Polyester is another synthetic fabric that can be used in seat covers and is known for its wrinkle resistance, fade resistance, and ease of maintenance. Vinyl is a synthetic material that is easy to clean and provides decent water resistance and can used in seat covers offering affordability and availability in various colors and textures. Also known as faux leather, leatherette is an artificial leather-like material that mimics the appearance of real leather and offers a premium look and feel without the cost of genuine leather.

Once the design and material selection are finalized, the next step is to create a pattern for the seat cover. The pattern is a template that can ensure the cover will fit the seat precisely while also enabling the seat cover be removed easily. Skilled pattern makers or computer-aided pattern cutting machines can be used for this task. After the pattern is ready, the selected material is laid out, and the seat cover pieces are cut according to the pattern's shape and size. Precision cutting enables a proper fit and a neat appearance. In some examples, the cut pieces are then stitched together using sewing machines or coupled together via other types of fasteners (e.g., zippers) that are sewn to the parts of the seat cover. In some cases, once the seat cover is fully assembled, additional finishing touches may be added, such as elastic straps or hooks to secure the cover to the seat, reinforced edges for added durability, or pockets for storage. Mesh or other materials can be sewn or attached into positions on the seat cover.

Figure 1:
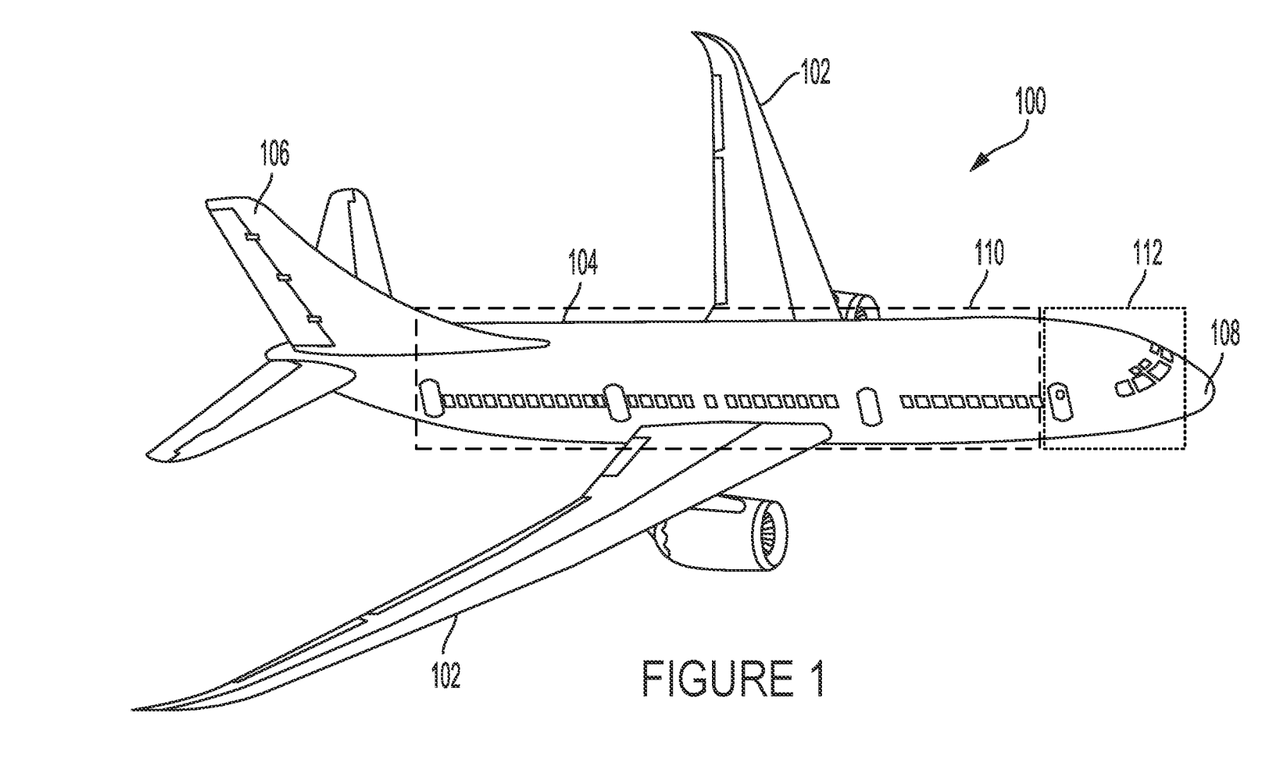
FIG. 1 illustrates a perspective view of an aircraft, according to an example implementation.

Referring now to the Figures, FIG. 1 illustrates a perspective view of an aircraft, according to an example implementation. The aircraft 100 is shown implemented with a set of wings 102, a fuselage 104, a tail 106, and a nose 108. In other embodiments, the aircraft 100 can have other configurations. The illustration in FIG. 1 also shows a position of a cabin 110 and a flight deck 112 of the aircraft 100. The cabin 110 and the flight deck 112, together collectively, make up the occupancy areas of the aircraft 100 where passengers and crew may occupy during flight. In particular, passengers may sit within the cabin 110 while pilots operate the aircraft from within the flight deck 112.

The cabin 110 in the aircraft 100 is the interior space where passengers are seated during a flight. In general, the cabin 110 is the main part of the aircraft 100 where travelers sit, relax, and are provided with various amenities and services. In some aircraft, the cabin 110 is divided into different sections, depending on the class of service (e.g., economy, business, first class) and the layout of the aircraft.

Within the cabin 110, seats are arranged in rows running from the front to the back of the aircraft 100. The number of rows can vary depending on the size and model of the plane. For instance, each row can consist of three to six seats, with armrests on both sides for each passenger. Some planes have wider seats in certain sections, providing more comfort and space for premium classes. Aisles are positioned within the cabin 110 to enable passengers, technicians, and flight crew to travel to different parts of the aircraft 100.

Figure 2:
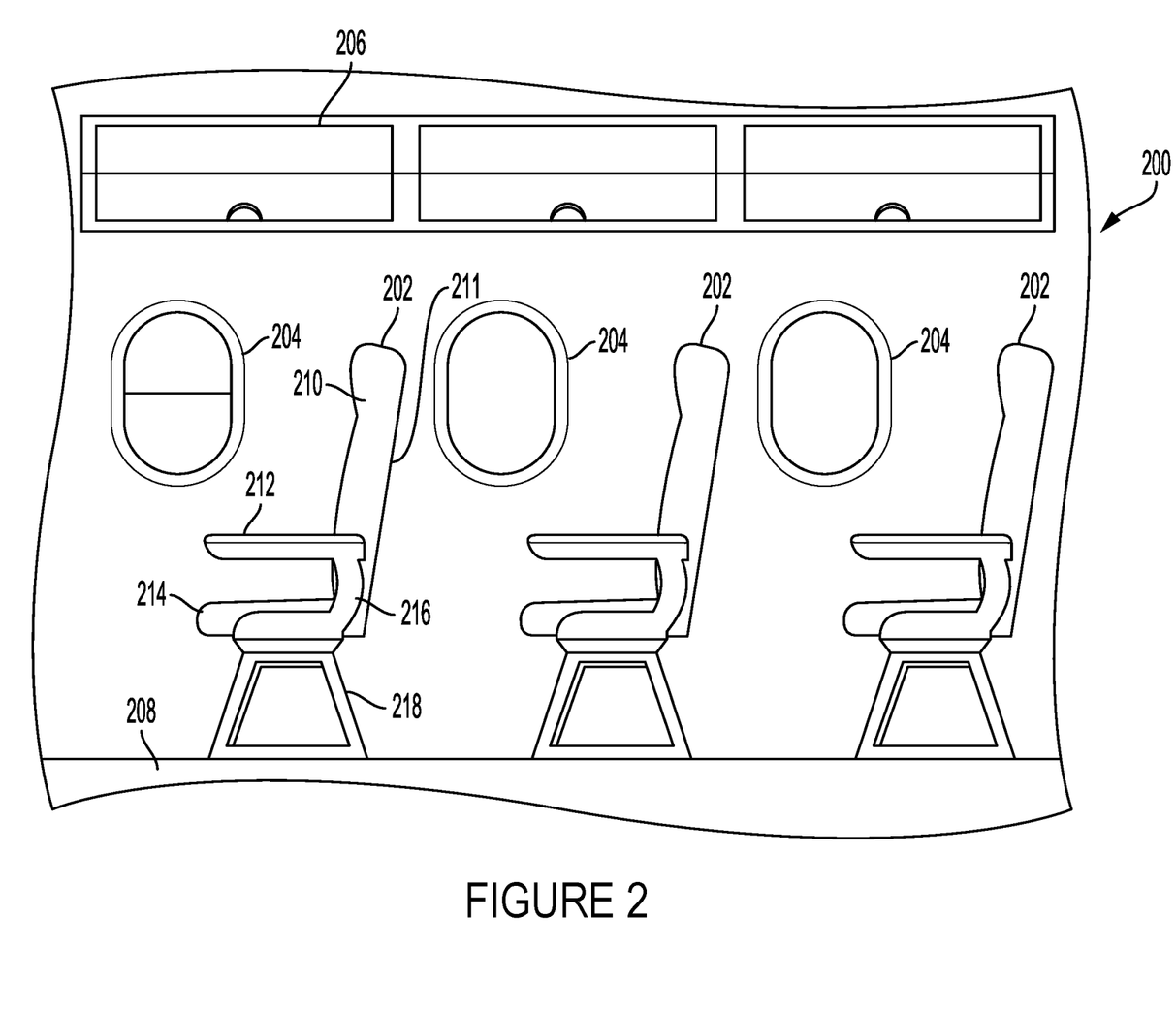
FIG. 2 illustrates an interior view of the cabin of the aircraft, according to an example implementation.

FIG. 2 illustrates an interior view 200 of the cabin 110 of the aircraft 100. In the example embodiment, the interior view 200 shows seats 202, windows 204, overhead compartments 206, and an aisle 208. In particular, the seats 202 are positioned next to the aisle 208. At such positions, the seats 202 may be exposed to dirt or sustain minor blemishes or damages during testing or servicing of the aircraft 100 due to carts, tools, and technicians using the aisle 208 to attend to different parts of the aircraft 100. In general, the seats 202 can be part of rows of seats that extend away from the aisle 208 and toward the windows 204. Each row of seats can partially extend under the overhead compartments 206.

Each seat 202 consists of different components that enable the seat 202 to securely provide comfortable seating to a passenger during flight, such as a headrest 210, a seatback 211, an armrest 212, a seat cushion 214, a side arm connector 216, and a base 218. The various components of the seat 202 contribute to its functionality and comfort. The headrest 210 is located at the top of the seatback 211 and provides support to the passenger's head and neck. The armrest 212 is part of a pair of armrests that are located on both sides of the seat 202 and included to provide support for the passenger's arms. For some seat designs, the armrests can be raised to enable easier access to the seat 202. In some instances, the armrest 212 positioned near the aisle 208 can sustain damage or dirt from people, carts, and tools that traverse the aisle 208.

The seatback 211 is the backrest of the seat that supports the passenger's upper body. The seatback 211 can be adjustable for some airplane seats, which allows passengers to recline the seat 202 to varying degrees for added comfort. The seat cushion 214 is the part of the seat 202 where passengers sit. As such, the seat cushion 214 is filled with foam or other padding materials to provide comfort during the flight. The design of the seat cushion 214 aims to distribute weight evenly and reduce pressure points, preventing discomfort during long flights.

The side arm connector 216 and the base 218 are part of the seat frame, which forms the basic structure of the seat 202. The seat frame can be made of lightweight and strong materials, such as aluminum or composite materials. The frame supports the entire weight and structure of the seat 202 and connects the seat 202 to the floor tracks on the aircraft 100 via the base 218. The side arm connector 216 connects the armrest 212 to the seat frame. The seat 202 can also include other components, such as a seatbelt along with a tray table and a monitor located on the backside of the seat 202.

Figure 3A:
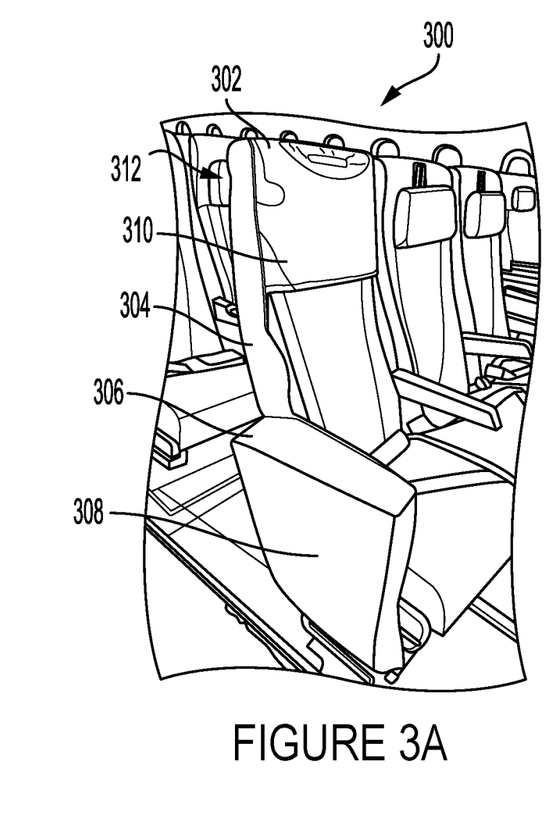
FIG. 3A illustrates a front view of a seat cover, according to an example implementation.

FIG. 3A shows a front view of a seat cover 300. The seat cover 300 includes a headrest cover 302, a side cover portion 304, and an armrest cover 306, which are shown partially covering a seat positioned next to an aisle of an airplane. For instance, the seat cover 300 can be used to cover the seat during production, testing, and delivery of the airplane. The seat cover can then be removed from the seat prior to a passenger using the seat. In other cases, the seat cover 300 is used to cover seats in other types of vehicles, such as buses and trains. The seat cover 300 can also be used in other environments, such as seat covers for seats located in theaters, concert halls, and other locations that have aisle seats. In some cases, the seat cover 300 is used on seats that are not positioned next to an aisle.

The headrest cover 302 is a part of the seat cover 300 that is configured to extend over a headrest of the seat. The headrest cover 302 has a front side 310 and a back side 312, which can provide protection to both sides of the seat's headrest. In some implementations, the back side 312 of the headrest cover 302 includes a mesh material to allow airflow relative to a monitor positioned on the back of the seat. The mesh material allows the monitor to be tested and viewed while also enabling heat from the monitor to escape out of the seat cover 300. As shown in FIG. 3A, the front side 310 of the headrest cover 302 has a rectangular shape. The shape of the front side 310 can differ for other example implementations.

The side cover portion 304 of the seat cover 300 couples together the headrest cover 302 and the armrest cover 306, thereby enabling the seat cover 300 to be a single piece. As shown in FIG. 3A, the side cover portion 304 extends along a side of a seat back of the seat.

The armrest cover 306 is configured to extend over an armrest of the seat positioned proximate the aisle of the vehicle. As shown, the armrest cover 306 includes a side surface 308 that extends from the armrest of the seat to a position below a seat cushion of the seat as the seat cover 300 protects the seat.

Figure 3B:
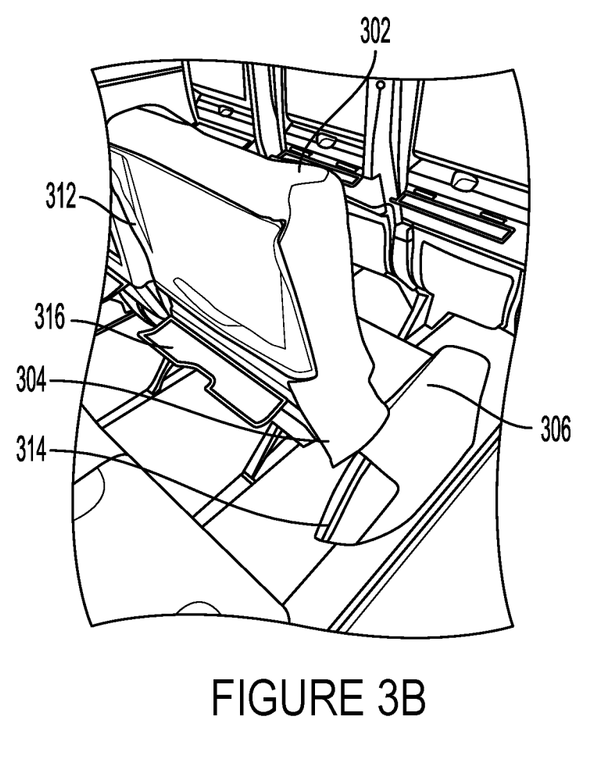
FIG. 3B illustrates a back view of the seat cover shown in FIG. 3A, according to an example implementation.

FIG. 3B illustrates a back view of the seat cover 300 shown in FIG. 3A. The back view of the seat cover 300 shows the back side 312 of the headrest cover 302, which can consist of a mesh material. For instance, the entirety or a portion of the back side 312 of the headrest cover 302 can be mesh material to enable the monitor on the back of the seat to be seen for testing and allows any heat to escape from the monitor, thereby preventing the monitor form potentially overheating.

In the example shown in FIGS. 3A-3B, the headrest cover 302 includes an inner padding configured to couple proximate the headrest of the seat when the seat cover 300 is coupled to the seat. The inner padding can provide additional protection to the headrest cover while also making it easier to place the headrest cover 302 over the headrest. In particular, the inner padding can be compressed, which allows the headrest cover 302 to be placed over the headrest of the seat. The inner padding then decompresses once the headrest cover 302 is on the headrest, which further secures the seat cover 300 at a fixed position on the seat. As such, the inner padding can include foam having a thickness that meets or exceeds a threshold thickness. The threshold thickness can depend on the type of material used to create the headrest cover 302.

In addition, the back side of the headrest cover 302 is configured to extend along a portion of the backside of the seatback of the seat such that the tray table 316 located on the back side of the seatback is able to open while the headrest cover 302 is extended over the headrest of the seat.

Similar to the headrest cover 302, the armrest cover 306 can include an inner padding configured to couple proximate the armrest of the seat when the seat cover is coupled to the seat. The inner padding can include foam having a thickness that meets or exceeds a threshold thickness. The threshold thickness can depend on a width of the armrest of the seat or may be a predefined thickness that helps prevent damage to the armrest. In addition, the armrest cover 306 can include one or multiple openings, slots, and/or mesh portions positioned on the armrest cover to enable lights located along the aisle floor and on the seat (e.g., on the armrest) to be tested.

In some examples, the headrest cover 302, the armrest cover 306, and the side cover portion 304 are made out of a nylon material. In addition, the headrest cover and the side cover portion 304 are shown sewn together and the armrest cover 306 is sewn to a bottom of the side cover portion 304. In other examples, other types of materials can be used. As shown in FIGS. 3A-3B, the width of the side cover portion 304 can exceed a width of the side of the seatback of the seat to provide protection to the side of the seatback.

Figure 3C:
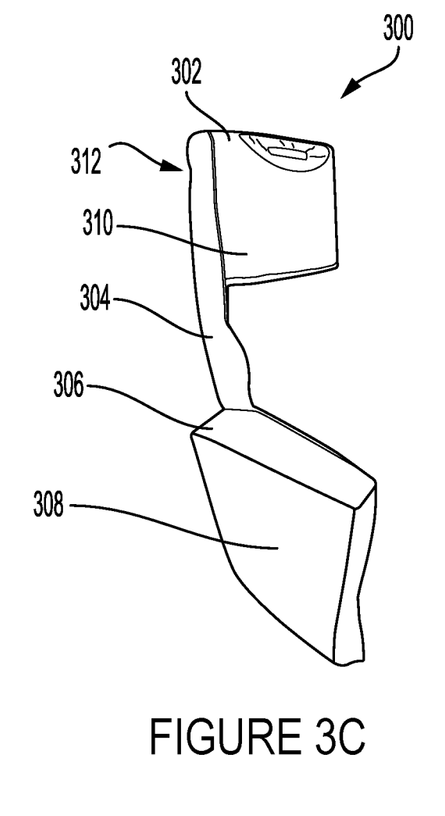
FIG. 3C illustrates an isolated front view of the seat cover shown in FIGS. 3A-3B, according to an example implementation.
Figure 3D:
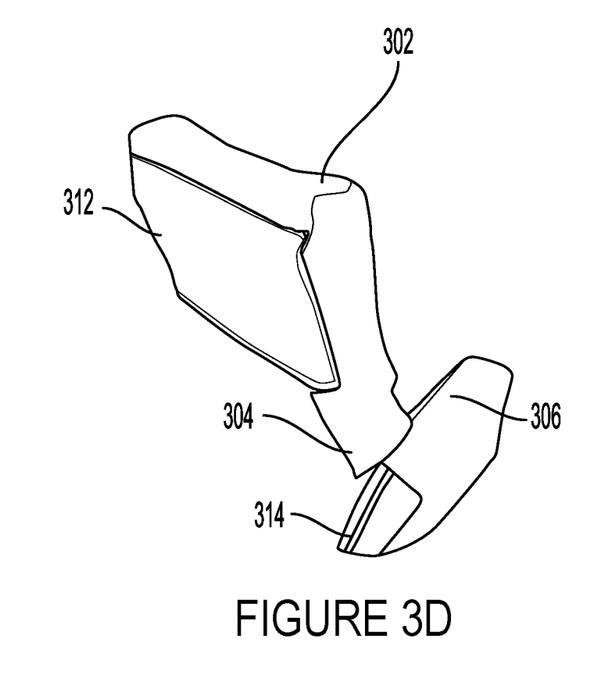
FIG. 3D illustrates an isolated back view of the seat cover shown in FIGS. 3A-3C, according to an example implementation.

FIG. 3C illustrates an isolated front view of the seat cover 300 and FIG. 3D illustrates an isolated back view of the seat cover 300. As shown, the seat cover 300 is crafted as a continuous, seamless piece of material that can fit over and protect parts of a seat, such as an economy aisle seat on an airplane. The seat cover 300 may have stitched seams along the edges to ensure durability and a neat appearance when coupled to the seat. In some examples, the seat cover 300 can be secured in place using elastic bands, straps, or hooks that tuck under or around the seat to hold it firmly.

In some examples, the seat cover 300 consists of different sections that are tailored separately to fit specific parts of the seat, which are then joined together using zippers or other fastening mechanisms to form a complete cover that first the seat snugly. The zippers, for example, can run along the edges of the cover, thereby allowing for easily assembly and disassembly. In some examples, the design of the armrest cover 306 and the side cover portion 304 can be switched to enable the seat cover 300 to be used and protect the armrest on a seat (and the seat in general) positioned on either side of the aisle.

Figure 4A:
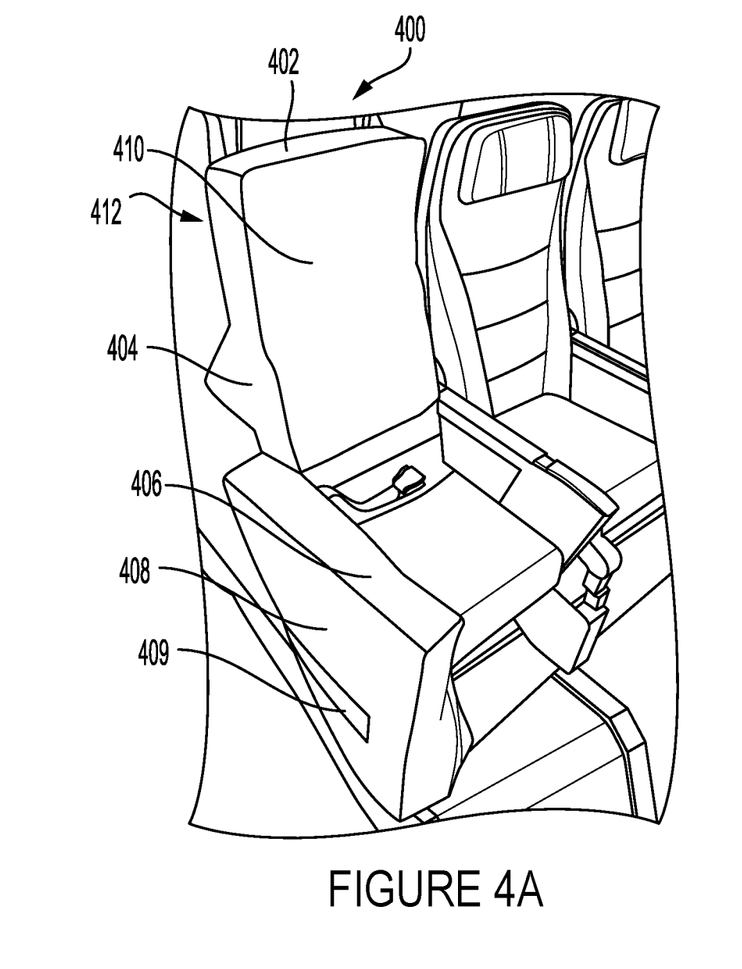
FIG. 4A illustrates a front view of another seat cover, according to an example implementation.
Figure 4B:
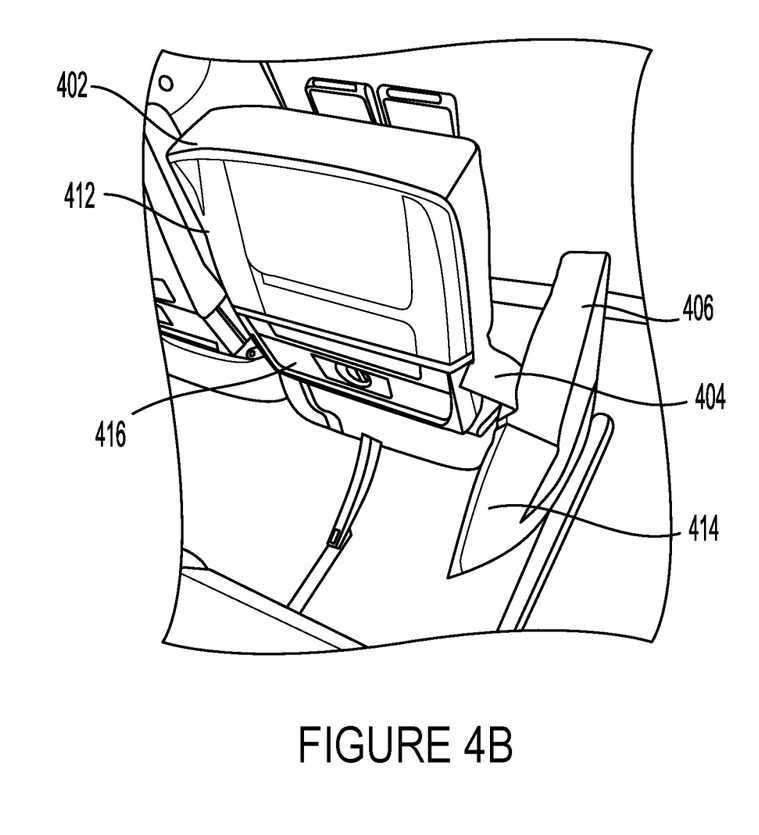
FIG. 4B illustrates a back view of the seat cover shown in FIG. 4A, according to an example implementation.

FIG. 4A illustrates a front view of another seat cover 400 and FIG. 4B illustrates a back view of the seat cover 400. Similar to the seat cover 300 shown in FIG. 3A-3B, the seat cover 400 includes a headrest cover 402, a side cover portion 404, and an armrest cover 406. In the example embodiment shown in FIGS. 4A-4B, the seat cover 400 is shown partially covering a seat positioned next to an aisle of an airplane, such as during production, testing, and delivery of the airplane to provide protection from tools, carts, and technicians that use the aisle to test or work on parts of the airplane. As such, the seat cover 400 can then be removed from the seat prior to a passenger using the seat. The seat cover 400 is used to cover seats in other types of vehicles, such as buses and trains, and/or in other venues that have aisle seats. In some cases, the seat cover 400 is used on non-aisle seats.

The headrest cover 402 is a part of the seat cover 400 that extends over and protects a headrest of the seat while also helping secure the seat cover 400 in a fixed orientation on the seat. As shown in FIGS. 4A-4B, the headrest cover 402 has a front side 410 and a back side 412. The back side 412 of the headrest cover 402 can include a mesh material in some implementations to enable airflow relative to a monitor positioned on the backside of the seat. In the example shown, the front side 410 of the headrest cover 402 has a rectangular shape that extends lower toward the seat cushion compared to the front side 310 of the headrest cover 302 of the seat cover 300 shown in FIGS. 3A-3B. The shape of the front side 410 can differ for other example implementations.

In some embodiments, the headrest cover 402 includes an inner padding configured to couple proximate the headrest of the seat when the seat cover 400 is coupled to the seat. The inner padding can provide additional protection to the headrest cover while also making covering the headrest cover using the headrest cover 402 easier. The padding can compress allowing the headrest cover 402 to be placed over the headrest of the seat and decompress once the headrest cover 402 is on the headrest, which further secures the seat cover at a fixed position on the seat. As such, the inner padding can include foam having a thickness that meets or exceeds a threshold thickness. The threshold thickness can depend on a width of the headrest or the width of the headrest pad positioned on the front of the headrest.

In addition, the back side of the headrest cover 402 is configured to extend along a portion of the backside of the seatback of the seat such that the tray table 416 coupled to the back side of the seatback is able to open while the headrest cover 402 is extended over the headrest of the seat.

The side cover portion 404 of the seat cover 400 is shown coupling together the headrest cover 402 and the armrest cover 406. As shown, the side cover portion 404 extends along a side of a seatback of the seat when the seat cover 400 is positioned on the seat. The armrest cover 406 extends over an armrest of the seat positioned proximate the aisle of the vehicle. As shown, the armrest cover 406 includes a side surface 408 that extends from the armrest of the seat to a position below a seat cushion of the seat as the seat cover 400 protects the seat.

Similar to the headrest cover 402, the armrest cover 406 can include an inner padding configured to couple proximate the armrest of the seat when the seat cover is coupled to the seat. The inner padding can include foam having a thickness that meets or exceeds a threshold thickness. The threshold thickness can depend on a width of the armrest of the seat. In addition, the armrest cover 306 can include a mesh slot positioned on the armrest cover such that the mesh slot is located proximate lights located at the seat when the seat cover is coupled to the seat.

In some examples, the headrest cover 402, the armrest cover 406, and the side cover portion 404 are made out of a nylon material. In addition, the headrest cover and the side cover portion 404 are shown sewn together and the armrest cover 406 is sewn to a bottom of the side cover portion 404. In other examples, other types of materials can be used. As shown in FIGS. 4A-4B, the width of the side cover portion 404 exceeds a width of the side of the seatback of the seat.

Figure 5:
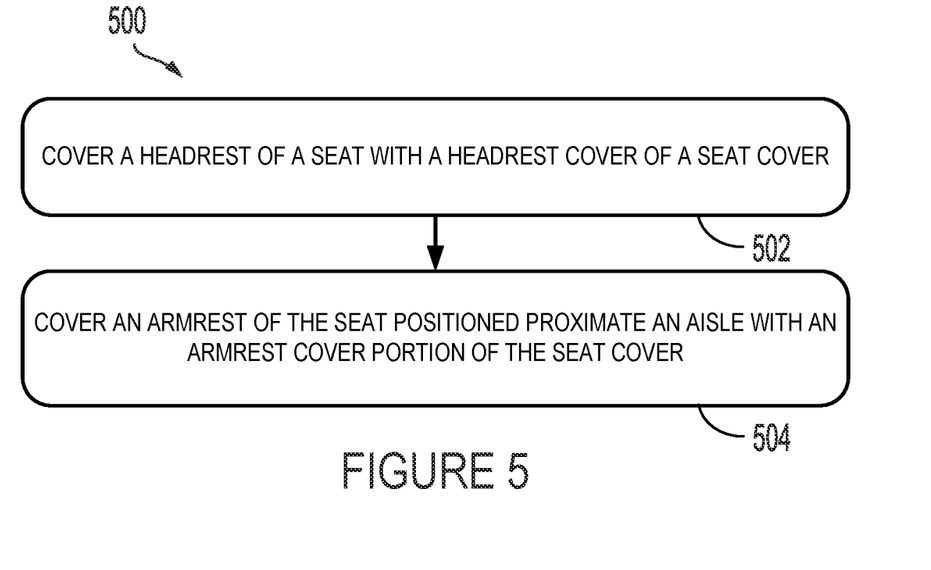
FIG. 5 is a flowchart of a method for using a seat cover to partially protect an aisle seat in a vehicle, according to an example implementation.

FIG. 5 shows a flowchart of a method for partially covering a seat, according to an example implementation. Method 500 presents an example method that could involving using the seat cover 300 shown in FIGS. 3A-3B, the seat cover 400 shown in FIGS. 4A-4B, or other seat covers disclosed herein. Method 500 can be performed by a technician or another person to protect aisle seats, such as aisle seats on airplanes, buses, trains, and/or aisle seats located in venues.

Method 500 can include one or more operations, functions, or actions as illustrated by one or more of blocks 502 and 504. Although the blocks are illustrated in a particular order, these blocks may also be performed in parallel, and/or in a different order than those described herein. Also, the various blocks may be combined into fewer blocks, divided into additional blocks, and/or removed based upon the desired implementation.

At block 502, method 500 involves covering a headrest of the seat with a headrest cover of the seat cover.

At block 504, method 500 involves covering an armrest of the seat positioned proximate the aisle with an armrest cover of the seat cover. The armrest cover includes a side surface that extends from the armrest of the seat to a position below a seat cushion of the seat, and wherein a side cover portion of the seat cover couples together the head cover and the armrest cover and extends along a side of the seat.

In some examples, method 500 also involves performing one or more tests of a seatbelt, one or more lights, or a monitor located at the seat while the seat cover is partially protecting the seat.

By the term "substantially" or "about" used herein, it is meant that the recited characteristic, parameter, or value need not be achieved exactly, but that deviations or variations, including for example, measurement error, measurement accuracy limitations, friction, and other factors known to skill in the art, may occur in amounts that do not preclude and/or occlude the effect the characteristic was intended to provide.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A seat cover for partially covering a seat positioned next to an aisle of a vehicle comprising:
   a headrest cover configured to extend over a headrest of the seat, wherein the headrest cover has a front side and a back side, and wherein a back side of the headrest cover includes a mesh material;
   an armrest cover configured to extend over an armrest of the seat positioned proximate the aisle of the vehicle, wherein the armrest cover includes a side surface that extends from the armrest of the seat to a position below a seat cushion of the seat when the seat cover is used to partially cover the seat; and
   a side cover portion coupling together the headrest cover and the armrest cover, wherein the side cover portion is configured to extend along a side of a seatback of the seat.

2. The seat cover of claim 1, wherein the vehicle is an airplane, and
   wherein the mesh material is configured to allow airflow relative to a monitor coupled to a rear of the headrest of the seat when the seat cover is used to partially cover the seat.

3. The seat cover of claim 1, wherein the front side of the headrest cover has a rectangular shape.

4. The seat cover of claim 1, wherein the headrest cover comprises an inner padding configured to couple proximate the headrest of the seat when the seat cover is coupled to the seat.

5. The seat cover of claim 4, wherein the inner padding comprises foam having a thickness that meets or exceeds a threshold thickness.

6. The seat cover of claim 1, wherein the armrest cover further comprises an inner padding configured to couple proximate the armrest of the seat when the seat cover is coupled to the seat.

7. The seat cover of claim 6, wherein the inner padding comprises foam having a thickness that meets or exceeds a threshold thickness.

8. The seat cover of claim 1, wherein the armrest cover further comprises a mesh slot positioned on the armrest cover such that the mesh slot is located proximate lights located at the seat when the seat cover is coupled to the seat.

9. The seat cover of claim 1, wherein the headrest cover, the armrest cover, and the side cover portion are made out of a nylon material.

10. The seat cover of claim 1, wherein a width of the side cover portion exceeds a width of the seatback of the seat.

11. The seat cover of claim 10, wherein a back side of the headrest cover is configured to extend along a portion of a back side of the seat such that a tray table coupled to the back side of the seat is able to open while the headrest cover extended over the headrest of the seat.

12. The seat cover of claim 1, wherein the headrest cover and the side cover portion are sewn together.

13. The seat cover of claim 12, wherein the armrest cover is sewn to a bottom of the side cover portion.

14. An aircraft comprising:
    a cabin having a plurality of seats, wherein the plurality of seats are arranged into rows, each row positioned relative to an aisle; and
    one or more seat covers coupled to respective seats of the plurality of seats that are positioned next to the aisle, wherein each seat cover comprises:
      a headrest cover configured to extend over a headrest of a seat, wherein the headrest cover has a front side and a back side, wherein a back side of the headrest cover includes a mesh material;
      an armrest cover configured to extend over an armrest of the seat positioned proximate the aisle, wherein the armrest cover includes a side surface that extends from the armrest of the seat to a position below a seat cushion of the seat when the seat cover is used to partially cover the seat; and
      a side cover portion coupling together the head cover and the armrest cover, wherein the side cover portion is configured to extend along a side of a seat back of the seat.

15. The aircraft of claim 14, wherein the mesh material is configured to allow airflow relative to a monitor coupled to a rear of the headrest of the seat.

16. A seat cover for partially covering a seat positioned next to an aisle of a vehicle comprising:
    a headrest cover configured to extend over a headrest of the seat;
    an armrest cover configured to extend over an armrest of the seat positioned proximate the aisle of the vehicle, wherein the armrest cover comprises:

a side surface that extends from the armrest of the seat to a position below a seat cushion of the seat when the seat cover is used to partially cover the seat; and a mesh slot positioned on the armrest cover such that the mesh slot is located proximate lights located at the seat when the seat cover is coupled to the seat; and a side cover portion coupling together the headrest cover and the armrest cover, wherein the side cover portion is configured to extend along a side of a seatback of the seat.

17. The seat cover of claim 16, wherein the headrest cover comprises an inner padding configured to couple proximate the headrest of the seat when the seat cover is coupled to the seat.

18. The seat cover of claim 17, wherein the inner padding comprises foam having a thickness that meets or exceeds a threshold thickness.

19. The seat cover of claim 16, wherein the armrest cover further comprises an inner padding configured to couple proximate the armrest of the seat when the seat cover is coupled to the seat.

20. The seat cover of claim 19, wherein the inner padding comprises foam having a thickness that meets or exceeds a threshold thickness.

\* \* \* \* \*